(12) United States Patent
Merkel et al.

(10) Patent No.: US 7,063,197 B2
(45) Date of Patent: Jun. 20, 2006

(54) BACKING PLATE FOR A DISK ASSEMBLY

(75) Inventors: Harald Merkel, Sinsheim (DE); Katharina Skop-Cardarella, Schwetzingen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/685,619

(22) Filed: Oct. 14, 2003

(65) Prior Publication Data
US 2005/0000776 A1 Jan. 6, 2005

(30) Foreign Application Priority Data
Oct. 18, 2002 (DE) ................. 020 23 324

(51) Int. Cl.
*F16D 25/0638* (2006.01)
(52) U.S. Cl. ............... 192/85 AA; 192/109 R
(58) Field of Classification Search ............ 192/85 A, 192/85 AA, 85 CA, 107 R, 109 R
See application file for complete search history.

(56) References Cited

U.S. PATENT DOCUMENTS

| | | | |
|---|---|---|---|
| 3,941,221 A | | 3/1976 | Pringle |
| 4,020,937 A | | 5/1977 | Winter |
| 5,234,090 A | * | 8/1993 | Haka ................. 192/70.25 |
| 5,511,644 A | * | 4/1996 | Murata ............... 192/85 AA |
| 5,701,976 A | * | 12/1997 | Kumagai et al. ......... 188/71.5 |

FOREIGN PATENT DOCUMENTS

| FR | 2533005 A | 8/1983 |
|---|---|---|
| GB | 902093 A | 7/1962 |

OTHER PUBLICATIONS

European Search Report in Application No. 02023324.3-1251 which corresponds to this U.S. Appl. No.

* cited by examiner

*Primary Examiner*—Saul Rodriguez
(74) *Attorney, Agent, or Firm*—Emch, Schaffer, Schaub & Porcello, Co., L.P.A.; Greg Dziegielewski

(57) ABSTRACT

Backing plate (11) of a disk assembly (L) of a force transmitting aggregate, in particular a multi-disk wet clutch (1) or a multi-disk wet brake, wherein the backing plate (11) is essentially ring shaped and in accordance with the invention comprises an essentially ring-shaped core plate (10) and an essentially ring-shaped backing shell (9), wherein the core plate (10) and the backing shell (9) are provided with adjacent surfaces and the backing shell (9) exhibits a profiling (P) about the circumference ($U_I$, $U_A$).

7 Claims, 5 Drawing Sheets

Fig.1
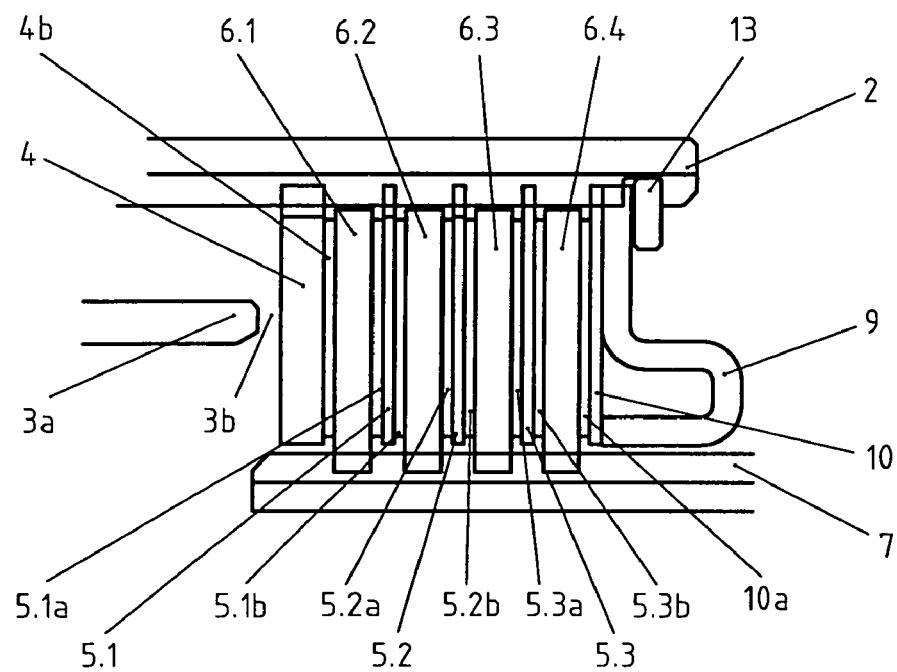
Fig.2 state of the art
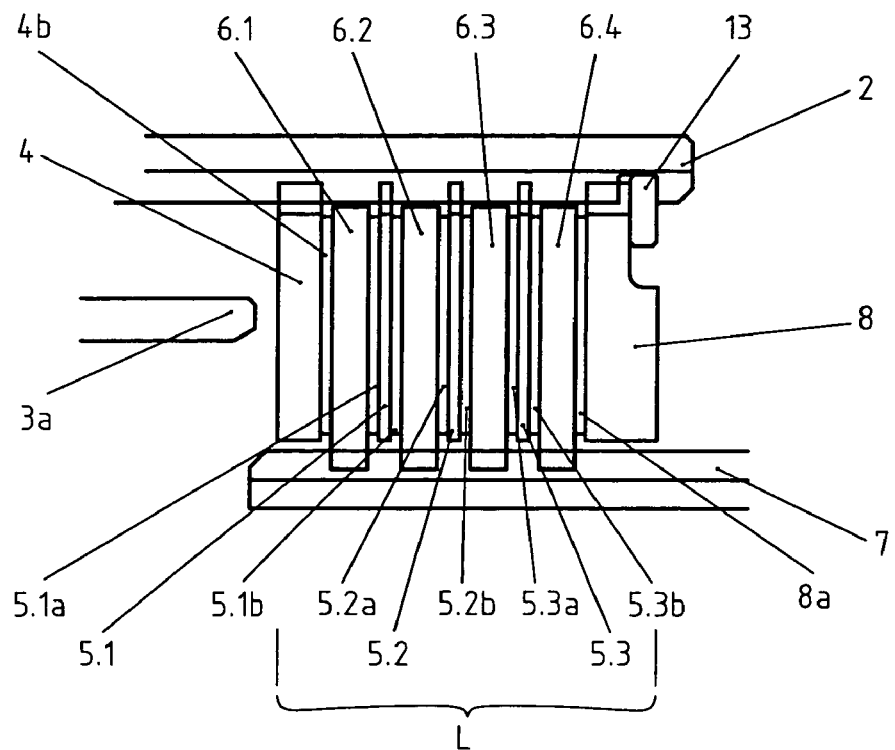

section A-A

Fig.3c
Detail X
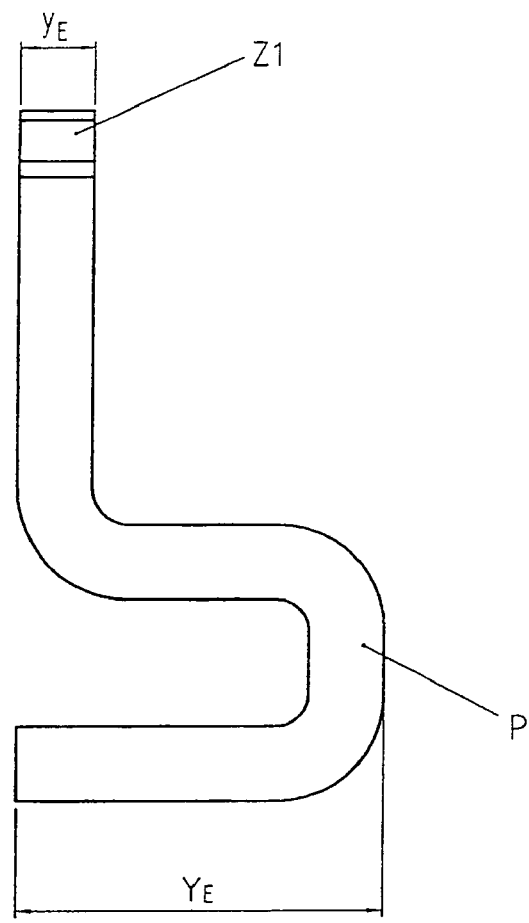
Fig.3d  ISO section A-A
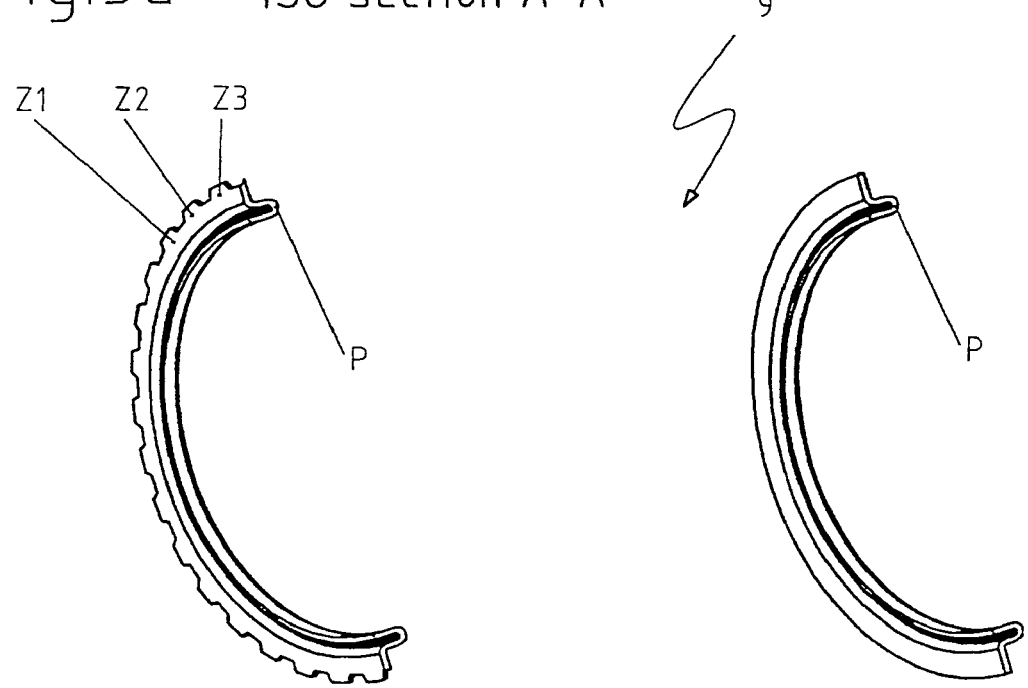

state of the art

BACKING PLATE FOR A DISK ASSEMBLY

CROSS-REFERENCE TO RELATED APPLICATION

This application claims priority application no. 02023324.3 filed Oct. 18, 2002.

The invention concerns a backing plate for a disk assembly of a force transmitting aggregate, in particular a multi-disk wet clutch or a multi-disk wet brake system, according to the precharacterizing portion of as show in drawings and described in the specification.

The thermal load and the axial-deflection of a backing plate subjected to surface pressure must, for functional reasons, be maintained as low as possible. For this reason, in the conventional multi-disk aggregates according to the state of the art, the backing plates are designed to be extremely thick, as can be clearly seen for example in FIG. 2. This measure, on the one hand, increases the difficulty of manufacture of such backing plates, and on the other hand, significantly increases the weight thereof.

The invention is thus concerned with the task of providing a backing plate which exhibits a high stiffness for prevention of deflection of the multi-disk aggregate, while at the same time being significantly reduced in weight.

This task is inventively solved by a backing plate having the features as described herein.

Advantageous embodiments and further developments of the invention can be seen from the features described.

The inventive backing plate is characterized thereby, that it comprises a core plate and a backing shell. Core plate and backing shell are essentially ring or annular shaped as is conventional for backing plates according to the state of the art. The novel backing shell is similar to the conventional backing plate in design, it has however a substantially smaller construction component thickness. In order to achieve a similar rigidity and stability, this inventive backing shell is provided with a profile design commensurate with the operating requirements. Since the backing shell may, due to this profiling, not satisfy the above described core plate or support function (carrying of a friction lining or providing a friction layer), a core plate is provided with one side flush against the backing shell (and preferably fixed against rotation). For example, the backing shell could lie with play radially inside or, as the case may be, outside at the outer diameter, against the internal teeth of the disk core plate (housing) (radial fixing or locking into position). The above-mentioned tasks—stiffening and carrying—are basically accomplished in the inventive embodiment by different construction components (differential construction).

Figure 1A:
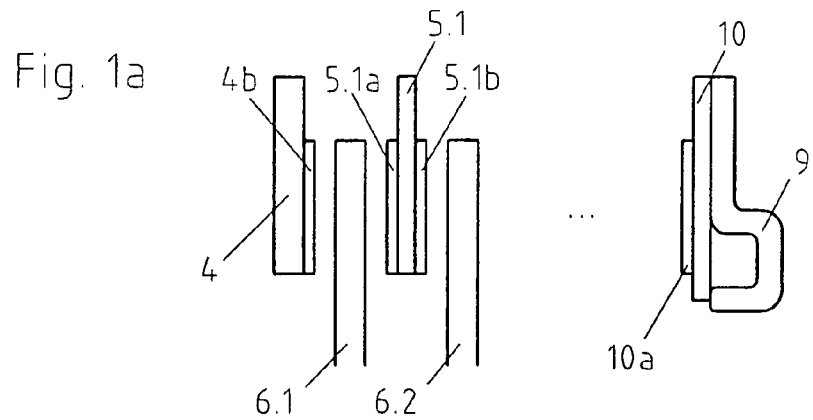
Figure 1B:
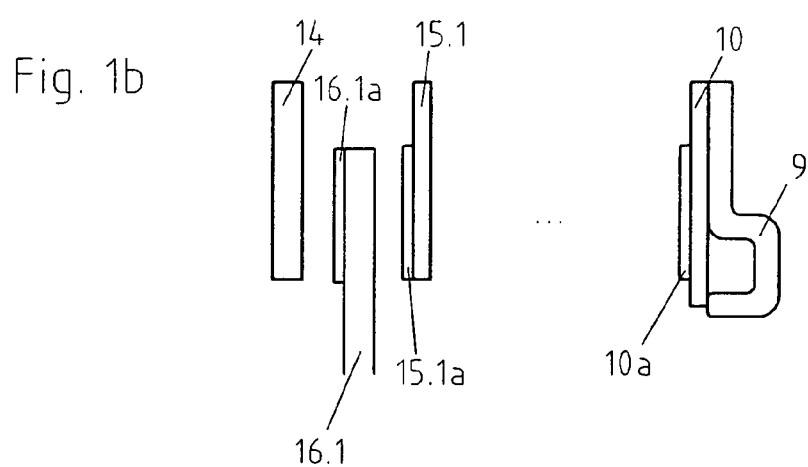

In a particularly advantageous embodiment of the invention it is envisioned that the core plate is a disk of already known type. Conventionally, that is, in a design as shown in FIG. 1a or 1b, the disk is a known type with a friction lining provided on one side, a so-called single-side friction plate. This is preferably constructed identically to the other friction plates and connected to the backing shell in series in the aggregate. This means in particular also, that these core plate disk and the friction plate preferably exhibit identical thickness.

As already discussed above, it is within the contemplation of the invention, that the core plate on its surface opposite the backing shell carries a friction lining. It is however also possible, that the core plate is not provided with a friction lining and essentially exhibits a friction surface as e.g. shown in FIG. 1c.

In a further embodiment of the invention it is envisioned, that the backing shell is (preferably also) in the form of a disk. The advantage is comprised therein, that in accordance therewith almost all construction components of the disk assembly can be produced in a uniform manufacturing process. The backing shell need merely essentially be provided with an appropriate profiling. As manufacturing process for introduction of a profiling of this type, there may be mentioned a rotation work process, preferred however for achievement of high production volumes are the stamping and deep drawing techniques. It is also possible that techniques such as sintering, pressure forming or the like can be employed.

An inventive "stabilizing" profiling can be realized in the most diverse fashion. It is thus possible for example in the circumference direction to provide projections preferably at regular intervals. It has however been found, that particularly advantageous characteristics can be achieved, when the profiling is a circumscribing stiffening corrugation or reinforcing groove. The introduction of this type of circumscribing groove can be realized by the above-mentioned processes, namely rotational working or stamping/deep drawing.

In accordance with the manufacturing technique various profiles can be produced economically and in large number with U-shaped or V-shaped cross section. This type of design of seam or groove leads to backing plates or, as the case may be, backing shells with the necessary high stiffness even though there is significant weight reduction.

As was already explained above, the backing plate according to the state of the art as a rule exhibits an external teething or gearing. It is of course also conceivable that the backing plate exhibits an internal teething.

In a two part embodiment of the backing plate in the inventive manner it has been found that a fixing of the core plate and backing shell to each other against rotation is not always essential in order to function. Accordingly, the backing shell may exhibit an external teething or, as the case may be, an appropriate inner teething or even no teething. Although a fixed against rotation connection between the core plate and backing shell is functionally not necessary, it is possible to directly establish a connection between core plate and backing shell via appropriate securing means in the appropriate surfaces of the core plate and backing shell; a connection fixed against rotation can however also be realized thereby, that both in the core plate as well also the backing shell may be provided with appropriate or corresponding teeth or gears (external teeth or internal teeth corresponding to the internal teeth or as the case may be external teeth of the outer disk core plate or as the case may be inner disk core plate). Affixing in the axial direction or, as the case may be, a direction connection between core plate and backing plate, is accordingly not necessary.

It has been found to be particularly advantageous, that in the case of the external teething of the backing shell, the profile is provided in the area of the inner circumference of the backing shell, and in the case of an inner teething of the backing shell, the profiling is introduced in the area of the outer circumference of the backing shell. This can be explained thereby, that it is particularly these areas respectively which are subject to the highest mechanical loads.

Modeling calculations and test runs have shown, that it is particularly advantageous, to select the relationship of the total thickness of the backing shell to the sheet metal thickness of the core plate to approximately 2 to 2.5, when the sheet metal thickness of the backing shell plus core plate substantially correspond to that of the disks of the disk assembly.

An illustrative embodiment of the invention is shown in the figures in comparison to a disk clutch according to the state of the art, and is described in the following in greater detail.

Figure 1C:
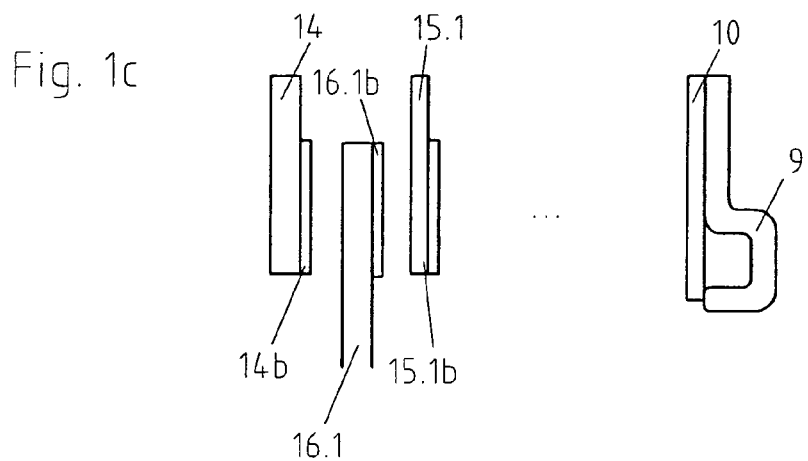

There is shown:
FIG. 1 a disk clutch according to the invention
a) with friction plates having friction linings on both sides
b) with friction plates with friction linings provided on one side (here: left hand side)
c) with friction plates with friction linings provided on one side (here: right hand side)
FIG. 2 a disk clutch according to the state of the art
FIG. 3 an inventive backing shell for a wet disk clutch
a) top view
b) section A—A
c) detail of X
d) ISO-section A—A
FIG. 4 a backing plate according to the invention
a) corresponding to the disk clutch according to FIG. 1, 1a (U-shaped cross section of profile)
b) corresponding to the disk clutch according to FIG. 1b (V-shaped cross section of profile)
c) corresponding to the disk clutch according to FIG. 1c (V-shaped cross section of profile)
FIG. 5 a backing plate according to the state of the art (FIG. 2).

The subject matter of the present invention will be described in the following on the basis of a side-by-side comparison of a disk clutch 100 of an automatic transmission according to the state of the art as shown in FIG. 2 and a disk clutch 1 according to the invention as shown in FIG. 1, 1a, 1b, 1c. It should however be noted, that the invention is concerned in general with force transmitting devices which employ a disk assembly, preferably with multiple disks, for transmission of force, which particularly engage in each other in the manner of meshing teeth, wherein respective adjacent disks can be brought into frictional contact with each other with the aid of a suitable operating device.

A conventional disk assembly L in an automatic transmission, as shown by way of example in FIG. 2 (detail view of the disk clutch 100 ), is essentially comprised of four different components, namely, a so-called pressure plate 4, and, as a rule, generally a large number of steel disks 6.1, 6.2, 6.3 and 6.4 and friction plates 5.1, 5.2 and 5.3 as well as a so-called backing plate 8. All components—pressure plate 4, steel disks 6.1, 6.2, 6.3, 6.4, friction plates 5.1, 5.2, 5.3 and backing plate 8—are essentially shaped rotation-symmetrically. They preferably possess planar, preferably ring-shaped, face surfaces. The area of the face surfaces is as a rule large in comparison to the thicknesses of the disks 5.1, 5.2, 5.3, 6.1, 6.2, 6.3 and 6.4.

As can be seen from the state of the art design as represented in FIG. 2, the pressure plate 4 as well as the backing plate 8 and the friction plates 5.1, 5.2 and 5.3, are provided with friction linings or surfaces 4b, 8a, 5.1a, 5.1b, 5.2a, 5.2b, 5.3a, 5.3b. While the pressure plate 4 and the backing plate 8 respectively only exhibit one friction lining 4b and 8a, the friction plates 5.1, 5.2 and 5.3 in the illustrative embodiment are provided on both sides with friction linings 5.1a, 5.1b, 5.2a, 5.2b, 5.3a, 5.3b. The individual disks 5.1, 5.2, 5.3, 6.1, 6.2, 6.3, 6.4 as well as the pressure plate 4 and backing plate 5 are arranged in such a manner, that the respective frictional surfaces 4b, 8a, 5.1a, 5.1b, 5.2a, 5.2b, 5.3a, 5.3b of the pressure plate 4, backing plate 8 and the friction plates 5.1, 5.2, 5.3 are arranged adjacent to the respective friction linings of the steel disks 6.1, 6.2, 6.3 and 6.4. In this concrete example, this results in an arrangement with the following sequence in the axial direction: pressure plate 4, steel disk 6.1, friction plate 5.1, steel disk 6.2, friction plate 5.2, steel disk 6.3, friction plate 5.3, steel disk 6.4 and backing plate 8.

It is further evident from FIG. 2 that the steel disks 6.1, 6.2, 6.3, 6.4 are made thicker than the friction plates 5.1, 5.2, 5.3. Further, the pressure plate 4 and backing plate 8 constructed as steel disks are also designed with greater thickness.

In FIG. 2 it is further shown that the pressure plate 4, the backing plate 8 as well as the friction plates 5.1, 5.3 and 5.3 are in the radial direction connected essentially fixed against rotation with a so-called outer disk core plate 2. In analogous manner, there is an operative engagement in the radial direction between a so-called inner disk core plate 7 and the steel disks 6.1, 6.2, 6.3 and 6.4. For establishing a connection of this type between the outer disk core plate 2 and the friction plates 5.1, 5.2, 5.3 as well as the pressure plate 4 and backing plate 8 or, as the case may be, the inner disk core plate 7 and the steel disks 6.1, 6.2, 6.3 and 6.4, the associated components exhibit teeth adapted for engagement. In particular, the pressure plate 4, the backing plate 8 and the friction plates 5.1, 5.2 and 5.3 exhibit external teething which engage in corresponding inner teething of the outer disk core plate 2, and the steel disks 6.1, 6.2, 6.3 and 6.4 exhibit inner teething which engage in an appropriate external teething of the inner disk core plate 7.

Now when these individual components—pressure plate 4, steel disks 6.1, 6.2, 6.3, 6.4, friction plates 5.1, 5.2, 5.3 and backing plate 8—are pressed firmly against each other by an appropriate press-force, then they are in condition to transmit, via the frictional engagement of the respective corresponding faces, torque introduced by the outer disk core plate 2 to the inner disk core plate 7 or, as the case may be, transmit torque introduced by the inner disk core plate 7 to the outer disk core plate 2. This is realized in a concrete embodiment thereby that an appropriate operating element 3a, which is represented in FIG. 2 in the extracted position, is pressed against the exposed surface of the pressure plate 4, so that this pressure plate 4 as well as friction plates 5.1, 5.2, 5.3, and also the steel disks 6.1, 6.2, 6.3 and 6.4 are pressed against the backing plate 8, which is essentially rigidly connected with the outer disk core plate 2 also fixed against movement in at least one axial direction.

In a torque transmission of this type the individual components—pressure plate 4, steel disks 6.1, 6.2, 6.3, 6.4, friction plates 5.1, 5.2, 5.3 and backing plate 8—are subjected to high thermal and mechanical loads. The warming up as well as in particular the axial deflection or expansion of the pressure plate 4, the friction plates 5.1, 5.2, 5.3, the steel disks 6.1, 6.2, 6.3, 6.4 and the backing plate 8 depends upon—besides the friction force transmitted by the operating element 3a and the diameters of the disks 4, 8 and the disks 5.1, 5.2, 5.3, 6.1, 6.2, 6.3 and 6.4—the thickness of the backing plate 8.

A backing plate 8 in a (wet) disk aggregate L with an, as a rule rotating, outer disk core plate 2 accordingly has two functions to accomplish:
1. stiffening of the disk aggregate L (stiffening function)
2. carrying a friction lining 8 a or as the case may be providing a friction lining (core plate function).

From the side-by-side comparison of FIGS. 1 and 1a, which shows the disk clutch 1 according to the invention, with FIG. 2, which shows a disk clutch 100 of an automatic transmission according to the state of the art, there results the following disclosed factual situation. For ease of understanding, in FIG. 1 and 1a the respective elements which in the inventive disk clutch are already known from the state of the art are provided with the reference numbers which were previously used in describing the corresponding elements in FIG. 2.

The multi-disk clutch 1 according to the invention is comprised essentially of the elements of the multi-disk clutch 100 according to the state of the art. The multi-disk clutch 1 according to the invention is comprised, similarly to the above-described multi-disk clutch 100, of the four components—pressure plates 4, steel disks 6.1, 6.2, 6.3, 6.4, friction plates 5.1, 5.2, 5.3 as well as a backing plate 11, wherein the latter is designed in a particular fashion in accordance with the invention.

The arrangement of the multi-disk assembly L corresponds to the previously described type, namely in the axial sequence of pressure plate 4 with friction lining 4b, steel disk 6.1, friction plate 5.1 with the friction linings 5.1a and 5.1b, steel disk 6.2, friction plate 5.2 with the friction linings 5.2a and 5.2b, steel disk 6.3, friction plate 5.3 with the friction linings 5.3a and 5.3b, and steel disk 6.4. Following this there is the inventive backing plate 11, comprised of backing shell 9 and core plate disk 10 with friction lining 10a (embodiment in the manner of a single-side-plate).

As in the above described embodiment according to the state of the art, the pressure plate 4, which is formed as a steel disk, the friction plates 5.1, 5.2, 5.3 as well backing plate 11 exhibit an external teething corresponding to the internal teething of the outer disk core plate 2. Correspondingly, the steel disks 6.1, 6.2, 6.3, 6.4 exhibit an inner teething corresponding to the outer teething of the inner disk core plate 7. Therewith the backing plates 4, 11 and disk 5.1, 5.2, 5.3, 6.1, 6.2, 6.3 and 6.4 are connected, fixed against rotation, with the appropriate disk core plates 2, 7. The backing plate 11 is further secured against sliding displacement in at least one axial direction by an axial securing element 13.

The operation of the inventive multi-disk clutch 1 corresponds identically to that of the multi-disk coupling 100 according to the state of the art. For illustrative purposes FIG. 1, 1a shows, with reference number 3a, the operating element in extracted position via which the disk aggregate L is pressed together and is able to transmit torque.

Figure 3A:
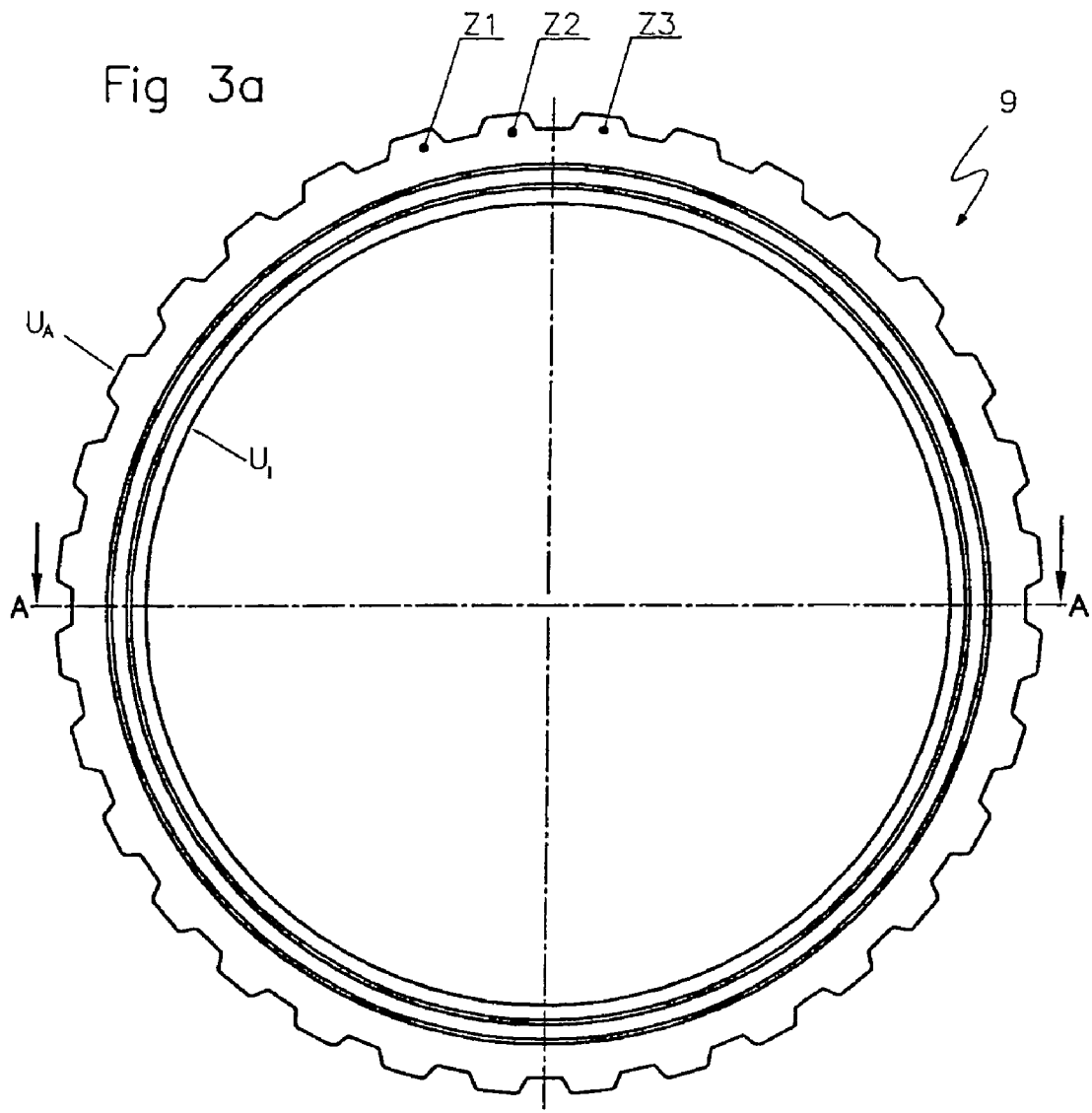
Figure 3B:
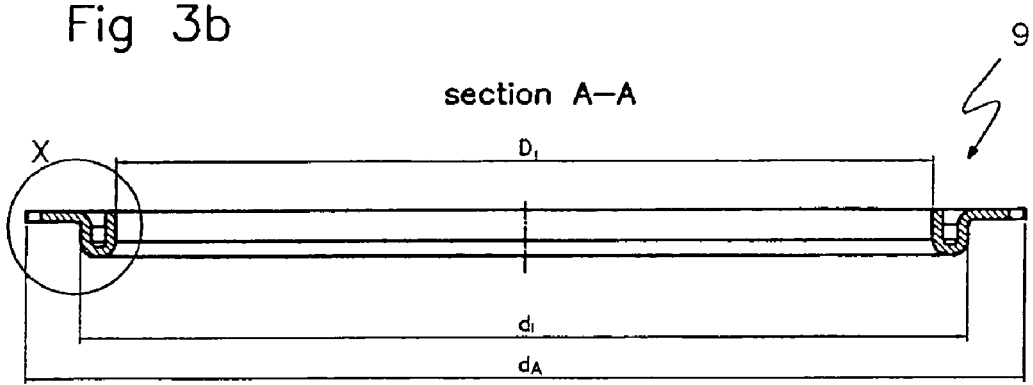
Figure 4A:
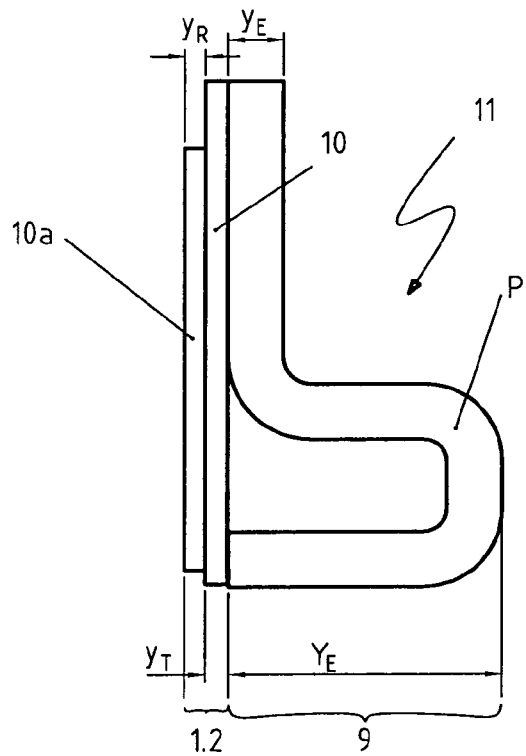

The particular design of the inventive backing plate 11 can be seen from the illustrative FIGS. 3a, 3b, 3c, 3d and 4a. As can be seen particularly from FIG. 4, the backing plate 11 is comprised of a core plate 10, which carries a friction lining or surface 10b, and an backing shell 9. Core plate 10 and backing shell 9 are congruent in this example, so that the entire backing plate 11, as can also be seen from FIG. 3a, is designed to be essentially ring shaped.

The backing shell 9 is, as can also be seen from FIGS. 3a, 3b, 3c and 3d, formed in the manner of a sheet metal disk. Teeth are provided along its outer circumference $U_A$ having a diameter $d_A$. Three of these teeth are referenced in FIG. 3a with reference numbers Z1, Z2, Z3 by way of example. In the area of the inner circumference U, of the backing shell 9 there is a profiling P, of which the design can be seen particularly in FIGS. 3c and 3d. The profiling P exhibits, as shown in these figures, a circumscribing crease or crimp having a U-shaped cross section, which extends from the inner diameter $d_I$ to the diameter $D_I$ of the backing shell. The depth of the profiling P is designed in the embodiment according to FIG. 3c to be substantially larger than the sheet metal thickness $y_E$ of the backing shell 9, so that an effective operational thickness of the backing shell $Y_E$ results.

Figure 5:
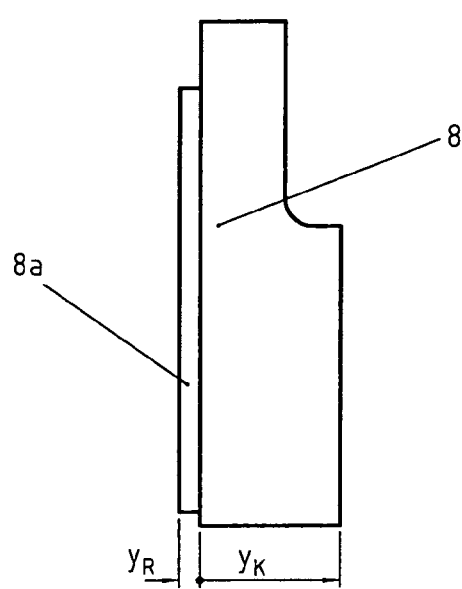

Model calculations and experimental tests have shown that with a backing plate 11 of the inventive type a disk clutch 1 can be produced, which exhibits almost the identical characteristics as a multi-disk clutch 100 according to the state of the art, while however the inventive backing plate 11 in comparison to such a backing plate 8 according to the state of the art exhibits a substantially reduced weight due to the use of a thinner sheet metal thickness with higher (in this example 40%!) stiffness. For illustration, Table 1 shows a comparison of the characteristic construction sizes of the conventional backing plate 8 according to the state of the art, as shown in FIG. 5, and a backing plate 11 according to the invention. Table 1 is based upon the presumption, that the identical inner and outer diameters of the individual disk 5.1, 5.2, 5.3, 6.1, 6.2, 6.3, 6.4 and disks 4, 8, 11 are employed as well as identical frictional forces are applied upon the multi-disk assembly L.

Table 1: Comparison of characteristic sizes of a conventional backing plate 8 according to the state of the art (FIG. 5) to a backing plate 11 according to the invention (FIG. 4) presuming identical inner and outer diameters of the individual disks 5.1, 5.2, 5.3, 6.1, 6.2, 6.3, 6.4 of the multi-disk assembly L as well as identical friction forces

| Conventional Backing plate 8 (state of the art) | Backing plate 11 (inventive) | Advantages of the new type of inventive backing plate 11 with backing shell 9 |
|---|---|---|
| Component thickness $y_K + y_R = 5.5$ mm | Backing shell $y_E = 2$ mm, $Y_E = 9$ mm, preceding friction plate $y_T + y_R = 1.5$ mm | Low sheet metal thickness |
| Deflection at the inner edge $f_K = 0.2$ mm | Deflection at inner edge $f_E = 0.12$ mm | Higher stiffness |
| Component weight $m_K = 400$ g | Backing shell $m_E = 260$ g, Core plate disk $m_T = 66$ g | Lower weight |

Figure 4B:
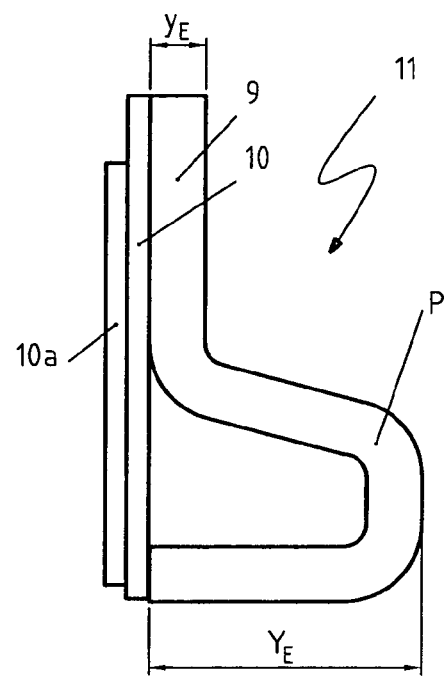
Figure 4C:
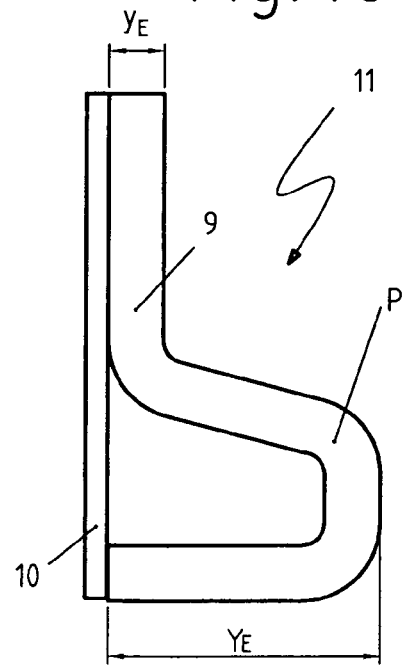

FIGS. 1b and 1c show multi-disk clutches 1 according to the invention consisting of similar components as shown in FIG. 1a but using friction plates having friction linings on one side only, so called single-side friction plates. The clutches 1 are comprised essentially of the elements of the multi-disk clutch 100 according to the state of the art. The multi-disk clutches 1 according to the invention are comprised, similarly to the above-described multi-disk clutch 100, of the four components—pressure plate 4, friction plates 16.1, 16.2, 16.3, 16.4, friction plates 15.1, 15.2, 15.3 as well as a backing plate 11, wherein the latter is designed in a particular fashion in accordance with the invention as shown in FIGS. 4b and 4c.

The arrangement of the multi-disk assembly L according to FIG. 1b shows the axial sequence of pressure plate 14, friction plate 16.1 with friction lining 16.1a, friction plate 15.1 with the friction lining 15.1a, friction plate 16.2 with friction lining 16.2a, friction plate 15.2 with the friction lining 15.2a, friction plate 16.3 with friction lining 16.3a, friction plate 15.3 with the friction linings 15.3a, and friction plate 16.4 with friction lining 16.4a. Following this there is the inventive backing plate 11, comprised of backing shell 9 and core plate disk 10 with friction lining 10a (embodiment in the manner of a single-side-plate).

The arrangement of the multi-disk assembly L according to FIG. 1c shows the axial sequence of pressure plate 14 with friction lining 14b, friction plate 16.1 with friction lining 16.1b, friction plate 15.1 with the friction lining 15.1b, friction plate 16.2 with friction lining 16.2b, friction plate 15.2 with the friction lining 15.2b, friction plate 16.3 with friction lining 16.3b, friction plate 15.3 with the friction linings 15.3b, and friction plate 16.4 with friction lining 16.4b. Following this there is the inventive backing plate 11, comprised of backing shell 9 and core plate disk 10 without friction lining (embodiment in the manner of a steel plate).

REFERENCE NUMBER LIST

1 Multi-disk clutch according to the invention
2 Outer disk core plate
3a Operating element in extracted position
4 Pressure plate/steel disk
4b Friction lining
5.1 Friction plate with outer teething
5.2 Friction plate with outer teething
5.3 Friction plate with outer teething
5.1a Friction lining
5.1b Friction lining
5.2a Friction lining
5.2b Friction lining
5.3a Friction lining
5.3b Friction lining
6.1 Steel disk with inner teething
6.2 Steel disk with inner teething
6.3 Steel disk with inner teething
6.4 Steel disk with inner teething
7 Inner disk core plate
8 Backing plate/steel disk according to the state of the art
8a Friction lining
9 Backing shell
10 Core plate disk
10a Friction lining
11 Backing plate according to the invention
13 Axial securing element
14 Pressure plate/steel disk
14b Friction lining
15.1 Friction plate with outer teething
15.2 Friction plate with outer teething
15.3 Friction plate with outer teething
15.1a Friction lining
15.1b Friction lining
15.2a Friction lining
15.2b Friction lining
15.3a Friction lining
15.3b Friction lining
16.1 Friction plate with inner teething
16.2 Friction plate with inner teething
16.3 Friction plate with inner teething
16.4 Friction plate with inner teething
16.1a Friction lining
16.1b Friction lining
16.2a Friction lining
16.2b Friction lining
16.3a Friction lining
16.3b Friction lining
16.4a Friction lining
16.4b Friction lining
100 Multi-disk clutch according to the state of the art
$m_E$ Mass of the backing shell
$m_T$ Mass of the core plate disk
$m_K$ Mass of the conventional backing plate
Z1 Teeth of the outer teething
Z2 Teeth of the outer teething
Z3 Teeth of the outer teething
L Disk assembly
P Profile
$d_I$ Inner diameter
$d_A$ Outer diameter
$U_A$ Outer edge/circumference
$U_I$ Inner edge/circumference
$y_E$ Thickness of the backing shell
$Y_E$ Effective operational thickness of the backing shell
$y_R$ Thickness of the friction lining
$y_T$ Thickness of the core plate
$y_K$ Thickness of the conventional backing plate
$f_E$ Deflection at the inner edge of the inventive backing plate
$f_k$ Deflection at the inner edge of the conventional backing plate

We claim:

1. Backing plate (11) for a disk assembly (L) of a force transmitting device,
the backing plate (11) is essentially ring shaped and comprises,
an essentially ring shaped core plate (10) and an essentially ring shaped backing shell (9),
wherein the core plate (10) and the backing shell (9) are provided with flat surfaces in the center region of the core plate and the backing shell and the flat surfaces are positioned in adjacent relationship to each other and the backing shell (9) exhibits a circumscribing (annular) ($U_I$, $U_A$) profiling (P) including an annular groove, the profiling being positioned adjacent the periphery of the backing shell to enhance the stiffness of the backing shells in the desired portion of the backing shell adjacent the periphery, the backing plate having external teething or internal teething, in the case of external teething (Z1, Z2, Z3) the profiling (P) is provided in the area of inner circumference ($U_I$) of the backing shell (9), and in the case of internal teething, the profiling (P) is provided in the area of the outer circumference ($U_A$) of the backing shell (9).

2. Backing plate (11) according to claim 1, thereby characterized, that the core plate (10) is a disk of conventional shape.

3. Backing plate (11) according to claim 1, thereby characterized, that the core plate (10) carries a friction lining (10a) on its surface opposite the backing shell (9).

4. Backing plate (11) according to claim 1, thereby characterized, that the backing shell is in the form of a disk (9).

5. Backing plate (11) according to claim 1, thereby characterized, that the backing shell (9) is produced by turning or machining, or is a stamped or deep-drawn part.

6. Backing plate (11) according to claim 1, thereby characterized, that the groove (P) exhibits an essentially U-shaped or V-shaped cross-section.

7. Backing plate (11) according to claim 1, thereby characterized, that the relationship of the total thickness ($Y_E$) of the backing shell (9) to the sheet metal thickness ($Y_T$) of the core plate (10) is substantially 2 to 2.5, when the sheet metal thickness ($Y_E$, $Y_T$) of the backing shell (9) plus the core plate (10) corresponds essentially to the thickness of the disks (6.1, 6.2, 6.3, 6.4, 5.1, 5.2, 5.3, 16.1, 16.2, 16.3, 16.4, 15.1, 15.2, 15.3) of the multi-disk clutch (L).

* * * * *